May 6, 1958 T. A. FEENEY ET AL 2,833,495
SIDESLIP STABILITY AUGMENTER
Filed March 13, 1953 5 Sheets-Sheet 1
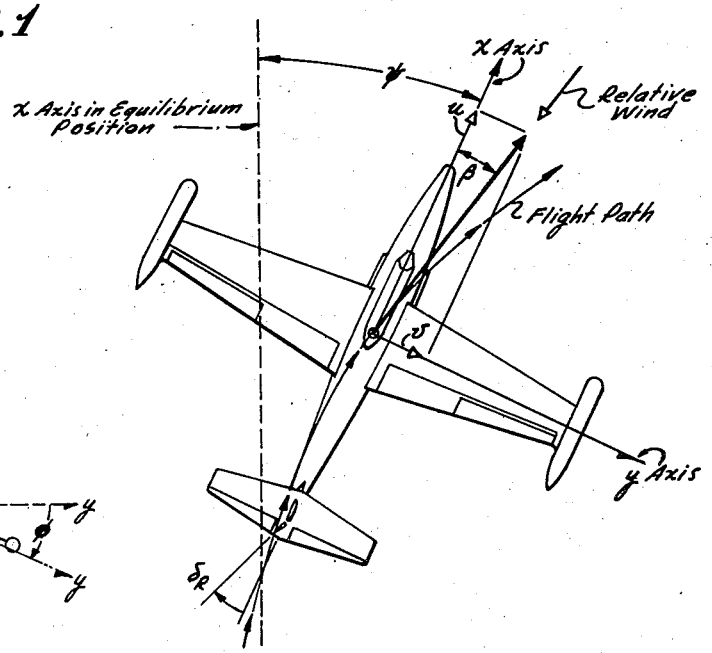
Fig. 1
Fig. 2
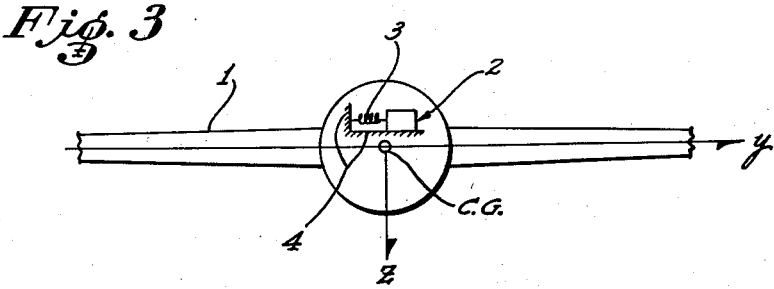
Fig. 3
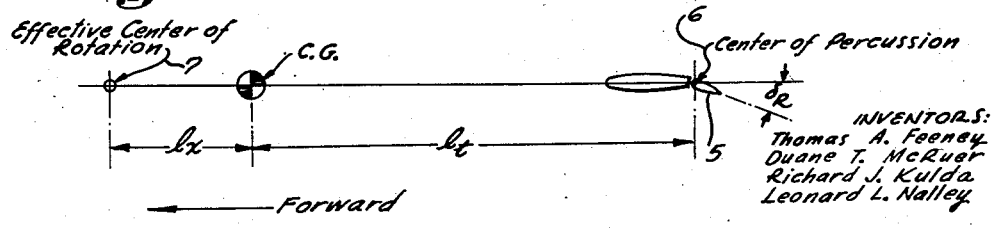
Fig. 4
INVENTORS:
Thomas A. Feeney
Duane T. McRuer
Richard J. Kulda
Leonard L. Nalley
By Herbert E. Metcalf
Their Patent Attorney

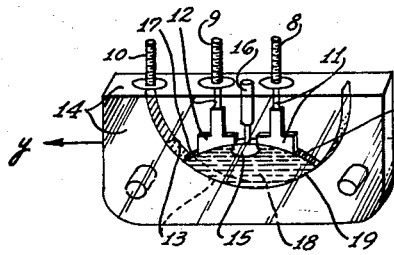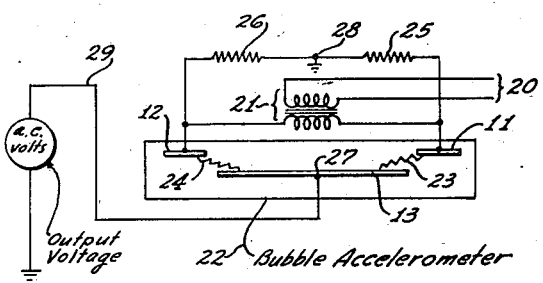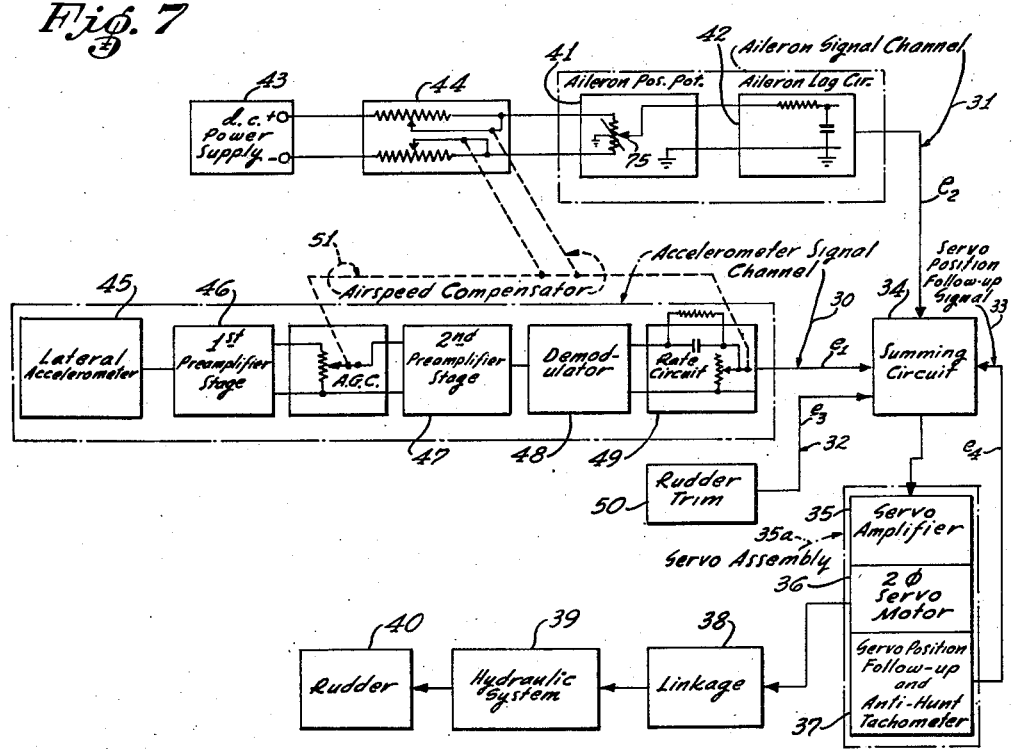

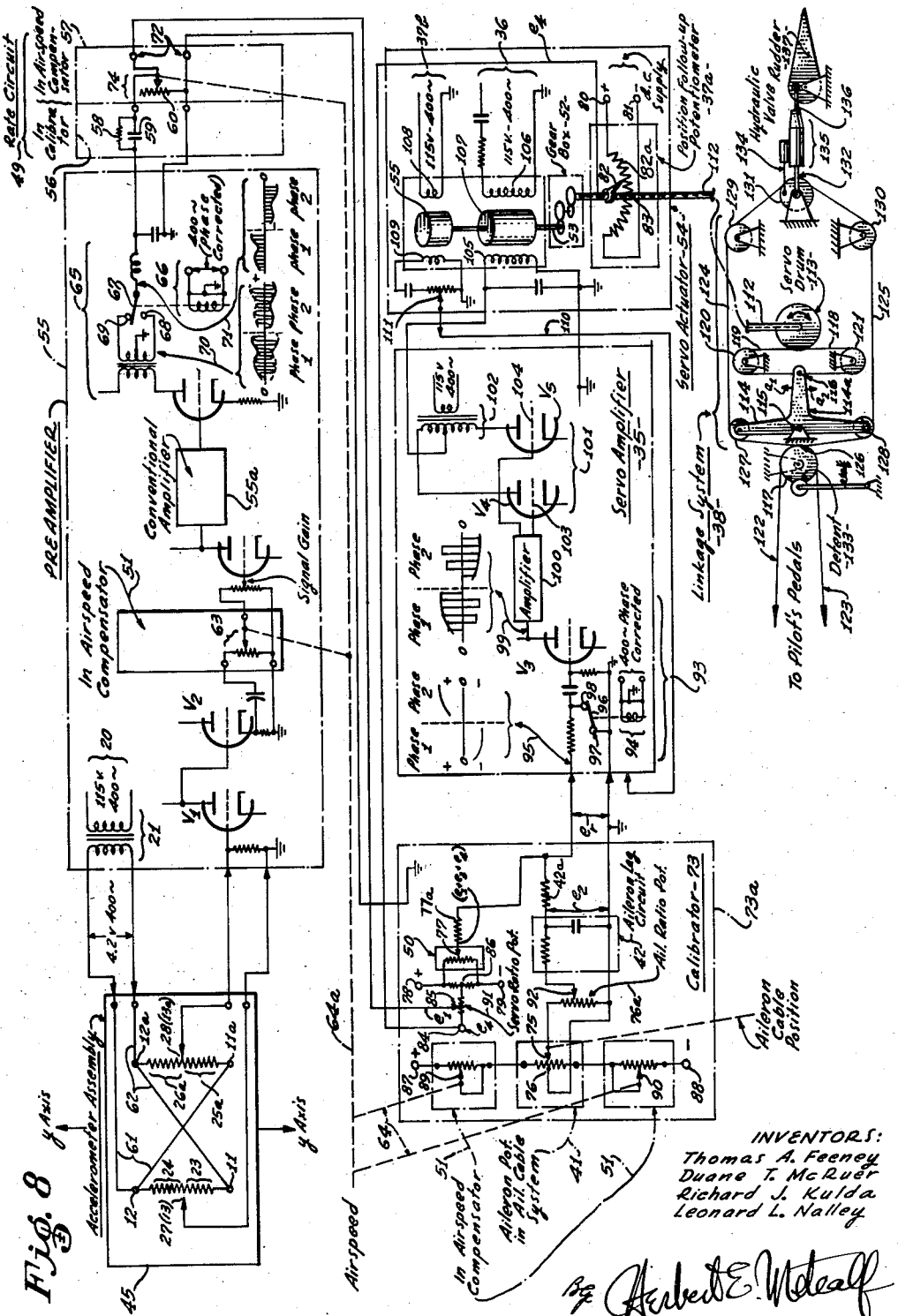

INVENTORS:
Thomas A. Feeney
Duane T. McRuer
Richard J. Kulda
Leonard L. Nalley

Their Patent Attorney

United States Patent Office 2,833,495
Patented May 6, 1958

2,833,495
SIDESLIP STABILITY AUGMENTER

Thomas A. Feeney and Duane T. McRuer, Los Angeles, Calif., Richard J. Kulda, Washington, D. C., and Leonard L. Nalley, Compton, Calif., assignors to Northrop Aircraft, Inc., Hawthorne, Calif., a corporation of California Application March 13, 1953, Serial No. 342,256

7 Claims. (Cl. 244—77)

The present invention is related to damping devices in aircraft for reducing lateral oscillations of the craft in flight and, more particularly, to a means and method for automatically increasing the dynamic lateral stability of fighter-type aircraft and for achieving this type of stability augmentation in a manner so as to aid the pilot in his attempts to carry out coordinated maneuvers.

Most high speed jet aircraft have a poorly damped so-called "Dutch roll" oscillation, which is a well known manifestation of lateral dynamic instability in which the craft goes periodically through a combined pendulum-like motion of roll, sideslip and yaw. This condition makes manual operation in both tracking and normal flight very tedious for the pilot. Fundamental tactical considerations for modern fighter-type aircraft require that during attack phases such aircraft be flown with very low sideslip angles. If, for instance, these fighter-type airplanes are armed with rockets which are aimed and fired at a target through the instrumentality of automatic fire control devices employing radar tracking means, the flight data computers in such systems compute a target collision course based on the assumption of zero sideslip angle. "Kill probability," under such conditions, becomes an inverse function of sideslip angle, i. e. the likelihood of the rocket reaching its target diminishes as the sideslip angle increases. Tracking maneuvers during rocket firing attack phases must therefore be well coordinated, and it is very desirable to employ maneuver coordinating devices which are capable of minimizing sideslip angles and which, in doing so, tend to help the pilot rather than oppose his attempts in coordinating his maneuvers. From the standpoint of automatic control, the reduction or elimination of sideslip makes the airplane essentially two-control, requiring minimum equalization in other axes and no complicated additional devices to facilitate coordinated turns.

The damping of the "Dutch roll" oscillation is becoming a very serious problem in modern aircraft design since it is aggravated by the trend toward higher wing loading, higher altitudes and smaller vertical tails. Present day stability augmenting methods have been successful only in a limited sense. For instance, a yaw damping installation for reducing "Dutch roll" oscillations has been designed in which the output from a yaw rate gyro is fed into the rudder channel as a damping signal. This device fulfills its purpose satisfactorily under certain conditions only. In attempted coordinated maneuvers of the aircraft for instance, the action of this installation tends to produce rudder motion giving a yawing moment in opposition to the maneuver. This rudder motion is non-linear in the sense that for all but the slightest maneuvers, the rates of yaw generated are sufficient to give the maximum rudder travel available to the yaw damper (1.66 degrees in one particular configuration). Therefore, the pilot has considerable difficulty coordinating the maneuver desired and experiences unusual rudder pedal feel.

It is an object of the present invention to introduce a maneuver coordinating device which greatly improves upon the above-mentioned yaw damping installation in that it is likewise capable of automatically increasing the "Dutch roll" damping but, in addition, provides means for minimizing sideslip during disturbances and maneuvers in a manner which tends to help attempted coordinated maneuvers of the pilot rather than to oppose them and thereby makes the airplane essentially two-control.

It is a further object of the present invention to minimize sideslip during tracking maneuvers and thereby to increase the so-called "kill probability."

Investigation of basic types of lateral damping augmenters has revealed that a damping device operative on a sideslip rate signal rather than on a yaw rate signal is equally capable of increasing the "Dutch roll" damping and tends to help coordination in attempted maneuvers. Single axis minimization of sideslip angle with suitable equalization for "Dutch roll" damping requirements is the most desirable type of control. The only direct means for achieving this type of control is that of minimizing sideslip through action of the rudder.

The sideforce on an airplane is directly proportional to the sideslip angle and the rudder deflection. This force results in a lateral acceleration. If a properly compensated accelerometer is oriented to "pick up" this acceleration, it can be used as a sideslip angle sensor. If the signal from this sensor is fed to the rudder in a sense opposing the sideslip angle, a source of static lateral stability is obtained. Electrical differentiation of the output of the accelerometer provides a rate signal which when fed to the rudder is a source of dynamic lateral stability. This is essentially the system of sideslip stabilization incorporated in the sideslip stability augmenter which constitutes the present invention.

It is therefore an additional object of this invention to provide a "Dutch roll" damping device which operates on a rate of sideslip signal.

A further object of the present invention is to provide satisfactory "pilot feel" during coordinated maneuvers.

The essential operating mode of the present invention can be briefly described as follows:

When the rudder is deflected, the airframe rotates without translation about some point forward of the center of gravity of the craft. If an accelerometer sensitive to lateral accelerations of the craft is located at this point, only that component of the sideforce due to sideslip will produce a signal at the accelerometer output. Thus, as the aircraft starts to sideslip, a sideforce directly proportional to the sideslip angle is exerted on the accelerometer. A modulated A. C. signal (such as 400 cycle) from the accelerometer is compared with the reference zero, and the difference, or error, is amplified, demodulated and differentiated in order to obtain a signal proportional to the rate of sideslip. The differentiated (rate) signal is made to modulate a (400 cycle) carrier so that the resulting signal can be used by A. C. power amplifiers to control a servo motor. A small displacement signal is allowed to bypass the rate or differentiating circuit in order to provide static stability augmentation. A pressure operated automatic gain control which operates as an airspeed compensator is inserted between the pre-amplified output of the accelerometer and the servo amplifier input. The servomotor output, through an appropriate "series" linkage, actuates a hydraulic system which effects a rudder deflection opposing the original sideslip of the airplane.

The present invention and further objectives thereof will be more fully understood by referring to the ensuing detailed specification and to the accompanying drawings of a preferred embodiment of this invention, in which—

Figure 1 is a schematic plan view of an aircraft in flight, presenting a lateral rotation of the stability axes ($x$- and y-axes) of the craft in a disturbed condition and giving graphic definitions of symbols used for identifying various displacement angles, velocity components, etc.

Figure 2 is a profile view of the craft of Figure 1 in the same disturbed condition, showing the y- and z-axes in a vertical plane (equilibrium positions and disturbed positions).

Figure 3 is a symbolized profile sketch of an airframe in a vertical plane of view, showing a simple mass-and-spring type lateral accelerometer mounted at the center of gravity of the craft.

Figure 4 is a sketch showing the positional relationship of the center of percussion, the center of gravity and the effective center of rotation in an airframe controlled by a rudder.

Figure 5 shows a schematic perspective view of a bubble type accelerometer unit in a preferred form of execution.

Figure 6 is a schematic diagram showing a single bubble accelerometer unit of the type illustrated in Figure 5 connected in a bridge system.

Figure 7 is a simplified block diagram showing the entire rudder control system of the sideslip stability augmenter.

Figure 8 is a simplified overall diagram showing essential details of mechanization of the sideslip stability augmenter rudder control system of Figure 7.

Figure 9 is a plot showing sideslip and rudder deflection-response curves for step rudder deflections (manual) before and after the sideslip stability augmenter system is turned on.

Figure 9:
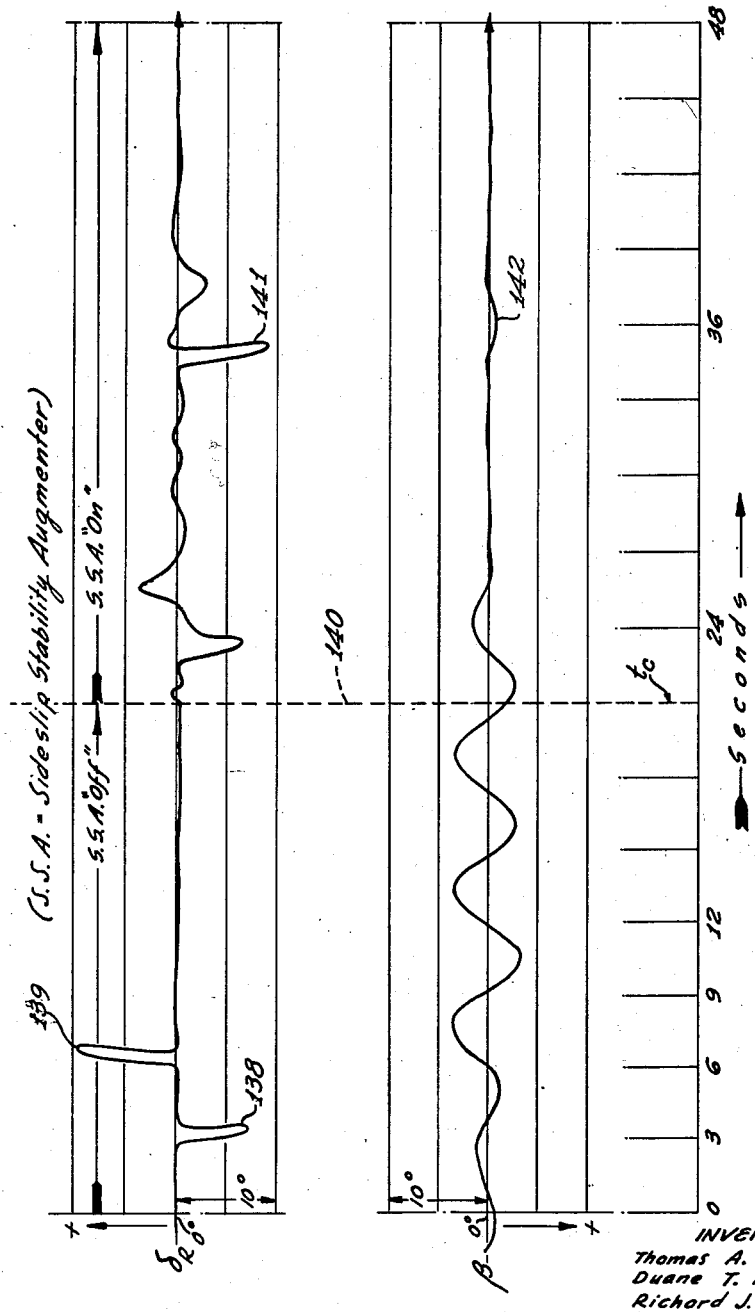

Referring first to the schematic plan view and profile view of an aircraft in flight given in Figures 1 and 2, respectively, the stability axes $x$, $y$ and $z$ of this craft are here shown in a laterally disturbed condition as referred to their equilibrium positions marked by the dashed lines $x$, $y$ and $z$. These drawings serve the sole purpose of graphically defining part of the symbols used in the subsequent specification and enumerated below. The given definitions follow essentially the annotations of the generally accepted nomenclature for aeronautics endorsed by the NACA (=National Advisory Committee for Aeronautics, United States). Various expressions used in the text are likewise defined below:

$a_y$=lateral acceleration along y-axis.
$\beta$=sideslip angle=angle between disturbed x-axis and relative wind; positive when nose is to the left of relative wind.
$\delta_R$=rudder deflection angle; measured positive when rudder is deflected to the left.
$\delta_A$=aileron deflection angle; measured positive when left aileron is deflected down.
$g$=gravitational acceleration constant.
$p$=angular velocity about x-axis or perturbed rolling velocity.
$r$=perturbed yawing velocity or yaw rate.
$u$=perturbed forward velocity.
$U_0$=steady state forward velocity.
$v$=lateral velocity of airplane along y-axis or perturbed side velocity.
$x,y,z$=aircraft stability axes through C. G. (=center of gravity):
$x$=longitudinal axis parallel to relative wind when aircraft is in equilibrium position;
$y$=lateral axis perpendicular to x-axis and horizontal when craft is in equilibrium position;
$z$=vertical axis, normal to x- and y-axes.
$Y$=force acting on airframe along y-axis.
$\phi = {_0}\!\int^t p\,dt$=bank angle or perturbed roll angle=angle between equilibrium y-axis and disturbed y-axis; positive when banking to the right.
$\psi = {_0}\!\int^t r\,dt$=perturbed yaw angle=angle between equilibrium x-axis and disturbed x-axis; positive when nose is to the right.
$Y_\beta \beta$=component of $a_y$ due to $\beta$.
$U_0 Y_{\delta_R}$=component of $a_y$ due to $\delta_R$.
Damping ratio=damping referred to critical damping=1.
Deadband or deadspot=maximum total excursion of input which does not produce an output.
Threshold=maximum change of input from zero which does not produce an output (threshold=½ deadband).

For a more complete description of the preferred embodiment of the sideslip stability augmenter which constitutes the object of the present invention, it is essential first to analyze the problem of measurement of sideslip angles.

Sideslip angles may be measured either by local flow direction detectors, such as vanes, probes, etc., by pressure differential devices, hinge movement differential devices, etc., or through the medium of accelerometers capable of sensing lateral accelerations due to sideslip as a portion of the total accelerations accruing from unbalancing forces which act upon the craft whenever its stabilized condition of flight is disturbed. The first mentioned direct measurements by local flow direction detectors are difficult to obtain and unreliable because these detectors have certain basic faults. In addition to being subject to adverse angle of attack effects and local flow disturbances, they require extensive calibrations in order to secure accurate readings. Any method of flight control based on error signals obtained from this source of direct measurement of sideslip angles is therefore far from offering an ideal solution to the problem in question.

A large number of other methods and instruments for measurement of sideslip angles have been investigated and evaluated on the basis of allowable maximum deadband, noise (including gunfire blasts, structural vibrations, and local aerodynamic effects), Mach number effects, angle of attack effects, possible mounting configurations, reliability, dynamic effects, and complexity. A suitably compensated accelerometer for measurement of the lateral acceleration of the airframe due to sideslip proved to yield the most promising solution.

It has been the aim to design the present sideslip stability augmenter to a degree of perfection so that it would be capable of maintaining sideslip angles within a deadband of ±0.15 degree during steady state flight. It can be shown that an accelerometer with a threshold of the order of 0.001 g's is required to meet these sideslip deadband demands. A bubble type accelerometer of improved design has therefore been selected because it offers the most satisfactory solution for these exacting demands. A preferred execution of this type of bubble accelerometer will later be briefly described with reference to Figure 5.

It is convenient at this point to derive an expression for the acceleration that is measured by a lateral accelerometer installed at the center of gravity of an airplane. Assume that the axis of the accelerometer is aligned correctly to read directly along the y-axis of the airplane. In order to understand the physical problem, consider a small mass-and-spring type accelerometer as shown in Figure 3 in which numeral 1 designates a simplified broken-away schematic profile view of an airframe, and numeral 2 an accelerometer mass, attached by spring 3 to a fixed support 4 which is located at the C. G. (=center of gravity) of the craft, mass 2 being freely moveable upon support 4 along the y-axis of the craft against the tension or pressure of spring 3. The reading of this accelerometer is the displacement of the small mass 2 relative to the airframe. A displacement and reading will occur under any of the three following conditions:

(1) When the airplane accelerates laterally along the positive y-axis, i. e. to the right, the accelerometer mass will be displayed to the left an amount proportional to the airplane acceleration, $$\frac{dv}{dt}$$

(2) When the airplane is turning to the right (without banking), the centrifugal force acting on the accelerometer mass will cause a reading proportional to the centripetal acceleration of the airplane, $U_0 r$. (Accelerometer mass displaced to the left.)

(3) When the airplane is banked to the right (without turning), the force of gravity on the accelerometer mass will cause a reading proportional to $-g \sin \phi \doteq -g\phi$. (Accelerometer mass displaced to the right.)

The total reading of this accelerometer can therefore be considered the sum of these three components and may thus be expressed as follows:

$$a_y = \frac{dv}{dt} + U_0 r - g\phi$$

This expression forms the basis for the design of the present lateral stability augmenter.

In a perfectly coordinated turn, in which no sideslip is present $$\left(\frac{dv}{dt} = 0\right)$$

the reading of the lateral accelerometer will be zero since the gravity forces of item (3), above, exactly balance the centrifugal forces of item (2), above. On the basis of this fact, it can also be shown that in a steady coordinated turn the rate of yaw is directly proportional to the bank angle and that, in general, for any maneuver in which sideslip is maintained at zero, the rate of yaw and bank angle are given by the relation $$r = \frac{g}{U_0} \sin \phi$$

Without further elaboration on aerodynamic theory and for a simplified presentation of the problems of sideslip stability augmentation, it suffices to state here that the following reasoning has led to a novel and satisfactory method of sideslip angle measurement which is incorporated in the present sideslip stability augmentation system:

The side acceleration of an airframe, measured by an accelerometer at the C. G. of the airframe, is proportional to the sum of a function of sideslip angle and a function of rudder deflection. In equation form:

$$a_y = Y_\beta \beta + (Y_{\delta_R} U_0) \delta_R$$

A signal directly proportional to sideslip angle could be obtained by subtracting a signal proportional to the side acceleration due to rudder deflection from the accelerometer signal (total side acceleration). In equation form:

$$a_y - (U_0 Y_{\delta_R}) \delta_R = Y_\beta \beta$$

If $(U_0 Y_{\delta_R} \delta_R)$ were to be subtracted electrically from an accelerometer signal, a rather stubborn noise problem would be encountered because of the low values of rudder deflection ($\delta_R$). Such a method of subtraction would also suffer from the disadvantage of requiring an additional component in the rudder channel.

A more desirable means for removing the $Y_{\delta_R}$ effect has been made available by moving the accelerometer location. Consider Figure 4 in which the so-called center of percussion relationship of the airframe as a rigid mass is schematically represented:

When rudder 5 is deflected (6=point of application of impulse to rigid body), the airframe rotates without translation about some point 7 forward of the C. G. (7=effective instantaneous center of rotation of rigid body which is subject to two equal and opposite accelerations: one due to the translational acceleration of the C. G. in one direction and the other due to rotation of 7 about the C. G. in the opposite direction. The effective tail length $l_t$ determines the distance $l_x$ of center 7 from the C. G.) Thus, if the accelerometer is located at point 7, only that component of sideforce due to sideslip (or "skid") will produce a signal at the accelerometer output. Mathematically this may be expressed by the equation $$l_x \dot{r} + (U_0 Y_{\delta_R}) \delta R = 0$$

where $l_x \dot{r}$ is the acceleration of the center of rotation 7 (Figure 4) about the C. G.

The accelerometer then reads $$a'_y \equiv a_y + l_x \dot{r} = Y_\beta \beta + (U_0 Y_{\delta_R}) \delta_R + l_x \dot{r}$$

where $a'_y =$ accelerometer reading at effective center of rotation of craft. Hence, if the condition is assumed that $\dot{r}$ is due to rudder alone, $$a'_y = Y_\beta \beta$$

While it is true that changes in the rate of yaw may be due to effects other than rudder deflection and that the above assumption which validates the last equation, above, is therefore strictly speaking only approximate, a thorough analysis of the effect on dynamic response accruing from the relocation of the accelerometer to point 7 of Figure 4 shows that, provided a suitable type of accelerometer such as the one selected in the present case is employed, the system can be easily so stabilized that the above equation holds true for all flight configurations.

It has been previously stated that in a steady coordinated turn, gravity forces which become effective in a lateral accelerometer located at the C. G. when the craft is banked, are exactly counterbalanced by the centrifugal forces becoming effective when the craft is turned. This condition applies equally to a lateral accelerometer located forward of the C. G. of the craft.

If a turn is not perfectly coordinated, the balance of the liquid mass in the lateral accelerometer will be disturbed so that the bubble either moves to the right or to the left (i. e. the mass of the liquid is accelerated either to the left or to the right, respectively). Rudder action resulting from a control signal derived from such an accelerometer unbalance must evolve in the correct sense of direction in order to nullify the unbalance. In order to counteract sideslip, for example, the ensuing unbalance control signal must act to deflect the rudder in a sense so as to produce an acceleration of the liquid which opposes the original unbalancing acceleration produced by the sideslip. Thus, if an aileron turn to the right is initiated and the craft begins to sideslip due to a prevalence of gravity forces over centrifugal forces which tend to accelerate the craft downwards towards the inside of the turn, the mass of the liquid in the bubble-type accelerometer will be accelerated towards the right. (The centripetal acceleration component on the craft is insufficient to produce a centrifugal acceleration of the liquid large enough to overcome the combined effect of gravitational pull on the liquid towards the right due to the craft's banking to the right and of acceleration of the liquid towards the right due to the centrifugal acceleration component on the craft which acts along its y-axis towards the left.) Therefore, if the rudder is deflected to the right, i. e. in the same direction towards which the liquid of the accelerometer has been deflected, the craft's centripetal acceleration towards the right and, therewith, the liquid's centrifugal acceleration towards the left will be increased. Thus, rudder action resulting from the original unbalance signal from the accelerometer due to sideslip will increase the centrifugal forces acting on the craft and thereby counteract the force of gravity. As stated, this will accelerate the liquid of the sideslip sensor towards the left and thereby reduce or eliminate the unbalance signal. If the sensor registers an unbalance due to "skidding" of the craft, rudder deflection in the opposite direction acts similarly to oppose unwanted accelerations of both the craft and the liquid.

The effects on the accelerometer liquid described in the preceding paragraph do not include two types of additional unbalancing forces which become manifest whenever an aileron turn is entered. Both these types of mass unbalance are due to the fact that the accelerometer is located ahead of the C. G. of the craft. In one case, acceleration of the sensor liquid towards one or the other side accrues from the well known adverse yawing moment about the C. G. of the airframe which is caused by the unequal drag on the wings issuing from an initial large aileron deflection. (This type of sensor acceleration takes place immediately after the ailerons are deflected and before the craft begins to roll into the turn.) A negatively (upward) deflected aileron produces less drag than a positively (downward deflected aileron. Thus, in an intended aileron turn to the right, the greater drag on the left wing resulting from the downward aileron deflection on this wing produces a counter-clockwise yaw moment. Since the bubble accelerometer is located ahead of the C. G. of the craft, the liquid is thereby accelerated to the right. Under the conditions of rudder control cited in the previous paragraph, this produces rudder deflection to the right which results in a clockwise yawing moment that automatically helps to overcome the adverse yaw due to aileron deflection and acts to accelerate the sensor liquid towards the left, i. e. towards the previously cited condition of balance which prevails as long as no sideslip (or "skid") is present.

The second above mentioned type of mass acceleration in the sensor occurs after the aircraft has overcome its inertia forces and begins to roll into the turn. It is caused by a large yawing acceleration on the craft about its C. G. in the direction of the desired turn which is due to the craft's rolling velocity as well as to roll-yaw inertia coupling effects (product of inertia) associated therewith. As in the previous case, this type of yawing acceleration is sensed by the accelerometer located ahead of the craft's C. G. However, in the present case, the yawing acceleration of the craft affects adversely the coordination in aileron turns in that its acts to accelerate the liquid of the accelerometer in a direction opposite to the desired turn, producing opposing rudder deflection with ensuing opposing yaw at a moment in which any build-up of sideslip should be prevented. For example, in entering a right aileron turn, the clockwise yawing acceleration of the craft results in acceleration of the sensor liquid to the left which causes rudder deflection to the left.

Thus it can be seen that the accelerometer signals will from the start cause the rudder to be deflected in a manner to oppose any yawing motion of the aircraft which is due to aileron deflection. However, the aircraft, after overcoming its inertia, is continuing to roll into the turn, and while the accelerometer is directing the rudder to eliminate the ensuing yawing acceleration in the described manner, the necessary rudder deflection which leads towards a coordinated turn is not made available during this initial stage of the aileron turn. For example, as the craft begins to roll to the right, a certain amount of right rudder should be applied to keep the airplane from sideslipping to the right. If this rudder deflection is not available at the onset of the craft's rolling motion, a sizeable rate of sideslip will be established before the accelerometer detects the sideslip and directs opposing rudder motion. The rudder action must then proceed to eliminate the rate of sideslip before the actual sideslip, i. e. the magnitude of the sideslip, can be reduced. This sideslip will continue to build up during the time the rate of sideslip is being reduced but will finally be eliminated.

The above described build-up of sideslip can be duly prevented by introducing a separate signal which causes the rudder to be deflected in the correct direction (i. e. to the right in the above example of an intended right aileron turn) and by a proper amount at the instant the aircraft begins to roll into the turn. That is, the rate of sideslip, and therewith the sideslip magnitude, can at the onset be held very nearly zero by this separate signal.

It is well known that a time lag is involved between the instant in which the ailerons are deflected and the instant in which the aircraft overcomes its inertia forces and actually begins to roll into the turn. Therefore, the above cited sideslip prevention signal to the rudder must be properly phased with this time lag if the desired turn coordination is to be achieved. This additional signal may be provided by a roll rate gyro which senses the roll rate as it actually develops and must be applied to the rudder in a sense opposite to that of a conventional roll damping signal to the ailerons; or it may be provided by a properly sensed signal proportional to aileron deflection which must be sent through a lag network so that the peak value of the aileron deflection signal is reached by the time the aircraft has overcome the inertia forces (the delay time being anticipated in this case).

An open loop-closed loop type of servo-system may be used to combine this additional signal with the earlier described accelerometer signal. The open loop portion of such a system provides approximate coordination of the turn, and the closed loop portion corrects any remaining sideslip. The open loop system may be controlled by a single lag signal proportional to aileron deflection or by two separate signals, one proportional to roll rate and one proportional to aileron deflection. These open loop signals operate to counteract the greater portion of the previously cited yawing adverse moments or, in effect, to augment the aircraft stability derivatives. The accelerometer, which is the sensing portion of the closed loop system, provides here the proper correction signal for perfect coordination of the turn.

In the system configuration of the present invention, a roll rate gyro has not been made available. Therefore, the open loop portion of the above mentioned open loop-closed loop system which constitutes the present sideslip stability augmenter system, comprises a single lag signal proportional to aileron deflection. This separate deflection signal is secured from an aileron potentiometer which is connected into the aileron cable system and is fed through a lag network and applied to the rudder actuator in the correct sense of direction (causing rudder deflection in the direction of the desired turn) and of a pre-adjusted magnitude in proportion to the average magnitude of the accelerometer signal so as to secure approximate coordination of turn maneuvers. If the aileron signal is either too small or too large so that a small amount of sideslip or skid may result, the accelerometer will sense this lateral acceleration and emit a signal which will either increase or reduce the total signal to the rudder so that the sideslip (or skid) is eliminated and a perfectly coordinated turn results.

As stated before, the unbalance signal due to sideslip which originates in the bubble accelerometer, must be differentiated in order to effectively increase the dynamic lateral stability of the craft. Since such a rate control signal allows a small steady state sideslip error to remain in flight, provisions have been made in the present sideslip stability augmenter which permit a small steady state error signal directly proportional to the sideslip angle to bypass the rate circuit. Rudder action from this integral control signal effectively reduces all steady state sideslip errors.

The damping characteristics of the above described sideslip stability augmentation system are such as to permit a 0.6 "Dutch roll" damping ratio for any one aircraft flight configuration.

An airspeed compensator connected to the Pitot-static system of the craft automatically controls the gain of the preamplifier in the accelerometer signal channel (to be briefly discussed further below) so that the proper amount of rudder deflection is obtained for best operation at all airspeeds. This automatic control of gain in accordance with airspeed is necessary due to the fact that larger rudder deflections are necessary at low speeds than at high speeds (i. e. the rudder is less effective at low speeds than at high speeds). Similar airspeed compensation is also applied to the aileron potentiometer signal voltage.

Rudder trim can be accomplished simply by the rotation of an electrical rudder trim control knob located in the pilot's cockpit. (See text accompanying Figures 7 and 8.)

Since automatic sideslip stabilization is to be employed in manual as well as automatic flight, a so-called "series" linkage is used to tie the rudder actuator into the hydraulic system. Details of a preferred form of such a series linkage system are described and claimed in the assignee's prior U. S. Patent No. 2,684,216. This same type of series linkage is schematically illustrated in the simplified overall circuit diagram of the sideslip stability augmenter given in Figure 8 and will be briefly described in the text accompanying this diagram, together with additional features of the present invention not previously mentioned.

One single unit of a preferred form of bubble accelerometer which acts as the sensing element in the present sideslip stability augmenter is illustrated in the simplified perspective drawing of Figure 5 in which numerals 11, 12 and 13 designate three electrodes, embedded in a plastic container 14 and conductively connected to the three external terminals 8, 9 and 10, respectively, which protrude from the top surface of container 14. A flat, curvilinear cavity 18 inside container 14 is almost entirely filled with a conducting fluid such as a solution of ethyl alcohol and sodium iodide, the small portion of the cavity not taken up by the fluid constituting an air bubble 15 which always tends to seek the most elevated location along the curved top boundary 17 of cavity 18 when the accelerometer unit is held upright as shown in the diagram. (Curvature of boundary 17 determines the natural frequency, gain and output linearity of the accelerometer.) The active surfaces of electrodes 11 and 12 (i. e. the portion of the electrodes not covered by the plastic material) are flush with the outline of boundary 17 and are in contact with the liquid of the cavity except for the space occupied by bubble 15. The size of the bubble is so proportioned that when the accelerometer unit is held in a level upright position as shown in Figure 5, each end of the bubble covers a small portion of the active contact surfaces of electrodes 11 and 12. Any lateral displacement of the bubble from this central or neutral position resulting from a lateral angle of tilt of the accelerometer unit from its level position or from a lateral translational acceleration of this unit, or from any other force tending to disturb the equilibrium of the liquid in cavity 18 along the plane of axis $y$, decreases the surface area in direct contact with the liquid of the electrode towards which the bubble is deflected while increasing the contact area of the other electrode, thereby increasing the effective resistance path through the electrode and liquid in the former case and decreasing this resistance path in the latter case. Electrodes 11 and 12 are insulated from each other by the plastic material of the container in which they are embedded and which fills the central space between these electrodes. A narrow sealed duct 16 (filler duct) which connects the top surface of the container with cavity 18 passes through this central space. Electrode 13 extends along the entire lower boundary 19 of cavity 18 and remains in constant conductive contact with the liquid in the cavity. It is curved into a semi-circle extending to the top surface of the container for the convenience of locating terminal 10 adjacent to terminals 8 and 9.

Figure 6 shows the accelerometer unit of Figure 5 connected into a bridge circuit supplied from an A. C. power source 20 via transformer 21. The accelerometer proper is schematically represented by box 22 containing electrodes 11, 12 and 13 which bear the same numerals as the corresponding electrodes of Figure 5. Box 22 must be visualized as being filled with the conducting liquid of the unit shown in Figure 5. When the accelerometer is in a level or horizontal position, the resistance path 23 through the liquid from electrode 11 to electrode 13 is equal to the resistance path 24 from electrode 12 to electrode 13. The values of resistances 25 and 26 are so chosen that in this condition, resistance path 23 is also equal to resistance 25, and resistance path 24 equal to resistance 26. Points 27 and 28 across this bridge arrangement will therefore be at the same potential (balanced bridge), and no current will flow through output circuit 29. As stated before, any displacement of bubble 15 of Figure 5 from its central or neutral position shown in Figure 5 will act to increase the resistance path from and to the one electrode towards which the bubble is displaced and will thereby disturb the balance of this bridge. If for instance, power source 20 in Figure 6 supplies a 400 cycle current, a 400 cycle unbalance or deflection signal will in this case appear in output circuit 29 whose magnitude will be proportional to the amount of deflection and whose phase will reverse whenever the sense of deflection is reversed.

In the actual installation of the sideslip stability augmenter two identical accelerometer units of the type illustrated in Figure 5 are employed, i. e. in the bridge circuit of Figure 6, bridge resistances 25 and 26 are replaced by a second accelerometer unit, the transformer connections to the second set of terminals actually being reversed as later shown in Figure 8 which causes the deflection output voltages of each unit to become additive, thereby increasing the "pickup" sensitivity of these combined bridge elements.

Proceeding now to a brief description of a preferred form of overall instrumentation of the sideslip stability augmenter as it appears when installed in the rudder control channel of an aircraft, reference is first made to the simplified system block diagram of Figure 7 which shows essentially four supply channels 30, 31, 32 and 33 converging in a summing circuit 34 and providing the latter with a composite D. C. signal whose magnitude and sense determines the magnitude and sense of shaft displacement in servomotor 36 of servo assembly 35a and the ultimate magnitude and sense of deflection of rudder 40 from neutral, the linkage system 38 and hydraulic system 39 serving to convert the shaft rotations in part 36 into corresponding rudder deflections in part 40. Aileron signal channel 31 is essentially composed of an aileron position potentiometer 41 which is connected into the aileron cable system (not shown; aileron cables passing around a drum whose rotational position affects the position of the contact link 75 on the potentiometer), and of an aileron signal lag circuit 42, D. C. power for this channel being supplied from source 43 via series resistances 44. The output voltage $e_2$ from this channel adds algebraically to the output voltage $e_1$ from accelerometer signal channel 30, the latter being composed essentially of lateral accelerometer assembly 45, first and second preamplifier stages 46 and 47, demodulator 48 and rate circuit 49, as well as to output voltage $e_3$ from rudder trim potentiometer 50 (see also Figure 8) which is simply taken from a voltage divider, the point of take-off being normally at a neutral or zero setting but adjustable to a small deflection voltage of positive or negative polarity. Irrespective of the sign of these individual supply voltages $e_1$, $e_2$ and $e_3$, the sign of the follow-up voltage $e_4$ from the servo actuator system 35a will always be opposite to the sign of the resultant voltage $(e_1+e_2+e_3)$. If this resultant voltage equals $+e_r$ at a given instant of time, the follow-up voltage $e_4$ will equal $-e_r$ as soon as shaft rotation in part 36 equivalent to voltage $+e_r$ has been completed. The algebraic sum of voltages $+e_r$ and $e_4$ is known as the error voltage. It is this error voltage that actually drives servo assembly 35a. (When the follow-up voltage $e_4$ is equal to $-e_{-r}$, the error voltage becomes zero and the servomotor shaft in part 36 stops rotating.) Assuming for instance that voltage $e_3$ has been set to zero, and that a disturbance occurs so that voltages $e_1$ and $e_2$ have some arbitrary value $+e_r$, then shaft 36 will rotate until $e_4$ is equal to $-e_r$ (i. e. until the error voltage is zero). However, rudder 40 will now be deflected in such a manner that $e_1$ will begin to decrease. The follow-up voltage $e_4$ will now be greater than the resultant voltage $+e_r$. Therefore, the error voltage becomes greater than zero, viz. it assumes a sign opposite to that of the initial error voltage. The servo shaft 36 now rotates in a manner so as to decrease voltage $e_4$ as well as the rudder deflection. As voltage $e_1$ continues to decrease, servo shaft 36 and rudder 40 continue to follow this decrease. If in the meantime the aileron voltage $e_2$ has been reduced to zero so that $+e_r$ is now equal to $e_1$ alone, the error voltage will be the algebraic sum of $e_1$ and $e_4$. Thus, when voltage $e_1$ becomes zero, voltage $e_4$ and, consequently, the error voltage become zero and the rudder has returned to neutral. If voltage $e_3$ has been set to any value other than zero, this value remains unchanged in summing circuit 34 as it is not affected by rudder action. Therefore, when $e_1$ and $e_2$ become zero, the resultant voltage $+e_r$ will equal $e_3$, and the error voltage will become the algebraic sum of voltages $e_3$ and $e_4$. Thus the error voltage is zero when follow-up voltage $e_4$ is equal to voltage $e_3$ and a steady state rudder deflection corresponding to voltage $e_3$ will remain.

If the craft is provided with a mechanical rudder force trim mechanism (artificial "feel" at the control pedals), an advantage of the electrical rudder trim feature in the present system accrues from the fact that the pilot is able to set rudder at any trim position and yet can maintain force trim at the same neutral position.

The magnitude of signal voltages $e_1$ and $e_2$ is also shown to be dependent on the setting of airspeed compensator 51 which operates automatically from the Pitot-static system of the craft not shown in the diagram.

A more detailed illustration of the functional layout of the block diagram of Figure 7 is given in Figure 8 in which the component parts already shown in Figure 7 bear the same numerals as in the latter figure. The component units of channels 30, 31, 32 and of the servo assembly 35a of Figure 7 are here presented in individual blocks partly differing from those shown in Figure 7 and representing here the actual separate physical units which make up the entire sideslip stability augmenter system.

Block 45=accelerometer assembly: This assembly has already been essentially described with reference to Figures 5 and 6, resistances 23, 24 and electrodes 11, 12 and 13 representing the parts bearing the same numerals in Figure 6, and the right half of the bridge system in Figure 8 being made up by a second accelerometer unit, as mentioned before, whose electrodes are symbolically represented by numerals 11a, 12a and 13a, the resistance paths of the liquid between these electrodes being designated with numerals 25a and 26a which correspond to the bridge arm composed of resistances 25 and 26 in Figure 6. See also orientation of y-axis parallel to the deflection path of the bubble of Figure 5, represented in Figure 8 by the direction in which resistances 23—24 and 25a—26a are drawn relative to axis y. Due to crossover of connection 61 from electrode 12 to electrode 11a and of connection 62 from electrode 12a to electrode 11, the exciting current from power supply 20 (in preamplifier unit of block 55)—such as 4.2 volt, 400 cycle—flows in opposite directions through the two parallel sensing elements (parallel=connected in parallel and mounted physically parallel alongside each other) and therefore effectively doubles all deflection output voltages across points 27 and 28 (electrodes 13 and 13a) which are due to unidirectional bubble deflections (=translational accelerations of unit 45 along axis y), and also cancels out all deflection voltages due to rotational accelerations about a point near the crossover of lines 61 and 62 shown in Figure 8.

The distribution of overall signal amplification is compromised by considerations of noise levels internal and external to the preamplifier, overload capacities of components (amplifier tubes, transformers, demodulator and modulator devices) and the very large dynamic range of operation (ratio of threshold/maximum signal is greater than 1:400). Only those portions of the circuitry essential for marking out the successive stages in the signal channels through the various component units are shown in the drawing of Figure 8. This circuitry is conventional in design and does therefore not warrant any detailed description.

Block 55=preamplifier unit: The first section of the preamplifier is used to increase the accelerometer signal voltage level to a value well above that of the maximum expected circuit noise inherent in the process of demodulation, differentiation and modulation. Tubes $V_1$ and $V_2$ are cascaded two-stage amplifiers with negative feedback (not shown). This feedback stabilizes the gain against variations of amplification from tube to tube (replaceability), changing loads (varying potentiometer settings of the airspeed compensator) and power supply variations (400 cycle inverter regulation). The output from $V_2$ passes through an automatic gain control 63 (see unit 51, below), and through a manual gain control, and is further amplified in part 55a. The function of demodulator 65 is to convert the amplified accelerometer signal (an A. C. voltage whose amplitude varies in accordance with the magnitude of sideslip or other lateral deflections and whose phase reverses whenever the sense of these deflections is reversed) to a D. C. voltage of a magnitude proportional to the magnitude of lateral deflections and of a polarity corresponding to the direction of deflection sensed by the accelerometer. A synchronous converter ("chopper") 66 has been selected for this function for reasons of necessary long time stability, freedom from altitude and temperature effects, low internal noise levels and high load capacity. This demodulator is required to enable the use of a simple RC rate circuit instead of a small servo system for providing the requisite phase lead. ("Chopper" 66 is synchronized to the 400 cycle signal voltage, and in alternating the position of blade 67 between contact 68 and contact 69 after each half-cycle of the 400 cycle signal carrier, operates as a full-wave rectifier which converts the phase 1 and phase 2 signal voltages into unidirectional voltages of positive and negative polarity, respectively, as illustrated graphically by the schematic wave forms 70 and 71 inserted below the respective circuit stages.)

Block 49=rate circuit (differentiation): As previously explained, the differentiation plus displacement circuit is used for two purposes: to increase the dynamic stability augmentation and to allow static stability augmentation. The rate network is made up of a fixed value resistor 58, a fixed value capacitor 59, and a potentiometer 74. The rate signal issuing at 72 is proportional to the algebraic sum of the time rate of change and the magnitude of the input voltage. It is also proportional to the setting of potentiometer 74. The variable resistance 60 (potentiometer 74) is controlled by airspeed compensator unit 51 and provides automatic change of the system damping, signal displacement and signal magnitude with change in airspeed and altitude. For signals at extremely low frequency (approximate static condition), the network is made up of resistors 58 and 60, and the signal issuing at 72 is solely proportional to the magnitude of the input voltage and proportional to the setting of potentiometer 74, thus allowing automatic static stability augmentation.

The left hand portion 56 of block 49 in the drawing of Figure 8 forms part of the calibrator unit 73 and the right hand portion 57, including potentiometer 74, part of the airspeed compensator unit 51 (see below).

Block 73a=calibrator unit 73, airspeed compensator unit 51, aileron potentiometer 41, rudder trim unit 50: These four separate units are here shown in a single block 73a representing the calibrator unit 73. Portions belonging actually to the last three separate units enumerated above are clearly outlined within this calibrator block 73a. As shown in the upper right corner of the drawing, the two halves 56 and 57 of block 49 form additional parts of calibrator unit 73 and airspeed compensator unit 51. Airspeed compensator 51 is an automatic gain control and voltage adjusting device, the latter portion thereof being composed of two differential pressure operated potentiometers (see series resistances across D. C. supply between points 87 and 88 in calibrator block 73a, the middle section of this network constituting aileron potentiometer 41) whose attenuation is inversely proportional to the differential pressure obtained from the airspeed indicator Pitot line and the static line (latter parts not shown; see links 64 which affect the position of potentiometer contacts 89 and 90). The voltage adjusting portion of airspeed compensator 51 thus acts to increase the magnitude of the aileron potentiometer signal at point 75 when the airspeed decreases, and to decrease this "basic" $e_2$ voltage when the airspeed increases. The gain control portion of airspeed compensator 51 which similarly adjusts the magnitude and displacement of the accelerometer signal $e_1$, already has been previously pointed out. (See link 64a to gain controls 63 and 74 in blocks 55 and 49, respectively.) Aileron potentiometer 41 and rudder trim potentiometer 50 have already been sufficiently described with reference to Figure 7.

A comparison with Figure 7 shows that composite voltage $e_r$ (error voltage) at the output from calibrator unit 73 is the algebraic sum of voltage $e_2$ from the aileron signal channel ($e_2$ is positive if potentiometer contact 75 is above neutral point 76, and negative if contact 75 is below this point) and voltage ($e_1+e_3+e_4$) from the combined accelerometer, rudder trim and servo-follow-up channels which appears at point 77. These voltages are properly attenuated in the output circuitry of block 73a so that voltage $e_r$ contains the correct proportions of the voltages from the indicated two separate channels. The D. C. potential source between points 78 and 79 in the calibrator block is identical with the D. C. potential source between points 80 and 81 across the servo shaft position follow-up potentiometer 37a in the servo actuator block 54. If the accelerometer output voltage $e_1$ at point 85 in calibrator unit 73 is zero and if servo follow-up voltage $e_4$ at point 84 in the same unit 73 is also zero (i. e. if contact 82 in block 54 rests at the neutral or center point 83 of follow-up potentiometer 37a), no voltage is added to or subtracted from point 86 midway (electrically) between points 78 and 79 of the same D. C. supply source shown in block 73a, this midway point therefore remaining also at neutral potential. In this condition, only the rudder trim voltage $e_3$ will appear at point 77, provided this contact point 77 has been shifted from its neutral (midway) position on the potentiometer shown in the rudder trim block 50. (Adjustable contact 77 represents the rudder trim knob in the cockpit.) If the accelerometer signal $e_1$ is positive with respect to ground, it will raise the voltage at point 77 correspondingly. Such a positive $e_1$ signal will act to rotate contact point 82 at follow-up potentiometer 37a in a sense so as to produce a negative $e_4$ voltage at point 84 in block 73a, therefore tending to oppose the $e_1$ voltage effective at point 85. As previously mentioned, the rudder action initiated by voltage $e_1$ will accelerate the airframe in a sense so as to reduce this $e_1$ voltage to zero, leaving an opposition voltage $e_4$ at point 84 which acts as a restoring signal of the correct magnitude and polarity for returning the rudder to its previously occupied (neutral) position. The position of contact 85 along servo ratio potentiometer 91 determines how much of the $e_1$ voltage is to be effectively added to the $e_4$ voltage at point 86, i. e. it fixes the ratio $$\frac{e_1}{e_4}$$

in the total output voltage ($e_1+e_3+e_4$) at point 77, the polarities of the individual component voltages, in actuality, reading in one of the following combinations:

| | | |
|---|---|---|
| | ($+e_1+e_3-e_4$) or ($-e_1-e_3+e_4$) | |
| or | ($-e_1+e_3+e_4$) or ($-e_1+e_3-e_4$) | |
| or | ($+e_1-e_3-e_4$) or ($+e_1-e_3+e_4$) | | voltage $e_2$ from the aileron channel being added algebraically either as a plus $e_2$ voltage or as a minus $e_2$ voltage, depending on the sense of aileron deflection. (If a positive $e_1$ voltage deflects the rudder to the right, a right turn aileron potentiometer signal $e_2$ must also be positive.) The position of contact 92 on aileron ratio potentiometer 76a determines the portion of the total aileron deflection voltage from point 75 to be made available at aileron lag circuit 42. The voltages ($e_1+e_3+e_4$) and $e_2$ in the output of calibrator 73 are added in parallel, resistors 77a and 42a determining the amount of voltages from the accelerometer- and aileron-channels, respectively, which contribute to the total output signal $e_r$.

Blocks 35 and 54=servo amplifier and servo actuator: Modulator 93 in the first section of servo amplifier 35 reconverts the $e_r$ signal (a D. C. signal of varying amplitude and reversible polarity) from calibrator unit 73 into a 400 cycle signal of varying amplitude and reversible phase, the amplitude of this A. C. voltage being the algebraic sum of voltages $e_1$, $e_2$, $e_3$, $e_4$, and the phase of this A. C. voltage being determined by the polarity of the $e_r$ signal. The operation of synchronous converter 94 is in principle a reversal of the process introduced by "chopper" 66 in preamplifier unit 55. If an $e_r$ deflection voltage of negative polarity is designated as phase 1 and a positive voltage as phase 2, as shown at 95, the intermittent grounding of voltage $e_r$ at a synchronous 400 cycle rate through the action of "chopper" 94 (blade 96 intermittently connecting point 97 with point 98) will generate a corresponding A. C. square wave output voltage of phase 1 or phase 2 in the plate circuit of tube $V_3$ as illustrated at 99. Conversion into a sinusoidal wave form and further amplification of the signal voltage in section 100 of servo amplifier 35 provide a suitable signal for use in comparator circuit 101 wherein the plates of tubes $V_4$ and $V_5$ are supplied wtih a 400 cycle voltage via transformer 102, and the 400 cycle signal voltage $e_r$ is applied across grids 103 and 104 of these same tubes. If the signal voltage is so phased relative to the phase of the plate voltages that phase 1 of the signal voltage drives the grid of, say, the left hand tube $V_4$ positive while the plate of this tube is simultaneously swinging positive, the currents discharging through this tube will induce a phase 1 voltage across control field 105 of two-phase-servo motor 36 in servo actuator unit 54 which will act to rotate armature or rotor 107 in one direction (phase 1 in control field coil 105 being adjusted to, say, lead the voltage in fixed field coil 106 by 90 degrees). Phase 2 of the signal voltage $e_r$, under these assumptions, in turn, will act to drive tube $V_5$ of comparator 101 to conduction when its plate voltage swings positive, inducing a voltage of opposite phase or phase 2 across control field 105 which lags the fixed field voltage by 90 degrees and therefore rotates armature 107 in the opposite direction. Armature 55 of the tachometer section 37b (which includes reference field coil 108 and output coil 109) rotates with armature 107 of servomotor 36 and serves as a velocity generator which induces in coil 109 a voltage proportional to the rate of rotation of armature 107, this voltage (or a portion thereof taken from potentiometer 111) serving as an anti-hunt signal in channel 110 feeding back to, say, the cathode of tube $V_3$ in servo amplifier unit 35 (connections not shown) for the purpose of minimizing servomotor overshooting.

As indicated in block 54, servomotor shaft 53 of armature 107 drives reduction gears in gear box 52 with output shaft 112 from this box being connected to servo drum 113 in the linkage system 38 and serving also as the driving element for moving contact 82 of the servo shaft position follow-up potentiometer 37a whose purpose has already been described.

The linkage system 38 shown in the diagram of Figure 8 is an auxiliary control mechanism which is tied into the pilot (i. e. pedal) operated rudder cable system and is known as a so-called "series" linkage system. It permits independent rudder control in addition to the normal pilot-controlled rudder movements without affecting the position of the rubber pedals in the cockpit. Servo drum 113, actuated by the above described shaft rotation of the servomotor, rotates bellcrank 114 about the stationary anchorage point 115 via cables 118 and 119 which pass around idler pulleys 120 and 121 and are attached to lever arm 114a of bellcrank 114 at point 116. See arrows $a_1$ and $a_2$ which indicate the two opposite directions of pull resulting from clockwise and counterclockwise rotation of shaft 53 of servomotor armature 107 (phase 1 or 2 of voltage $e_r$). Assuming main cable drum 117 to be quiescent (no pedal action via cables 122 and 123), it can be seen that since the main cables 124 and 125 emanating from point 126 at main cable drum 117 are deviated around pulleys 127 and 128 at the extremes of bellcrank 114 and around pulleys 129 and 130, respectively, in the manner shown in the drawing before being attached to quadrant 131, rotation of bellcrank 114 about point 115 in a clockwise direction, for example, will shorten cable 124 between points 126 and 132 while simultaneously lengthening cable 125 between these same points by an equal amount. Quadrant 131 is thereby rotated in the desired direction while main cable drum 117 is held stationary. In order to insure that the described changes in rudder cable lengths do not react upon the pedal position in the pilot's cockpit, a spring loaded detent 133 is provided which holds drum 117 firmly in place so that it can be rotated only through the leverage forces applied through pedal action but not through any possible torque which may become effective at point 126 as a result of the rotation of bellcrank 114. For optimum operation of the system, it is essential that detent 133 be properly seated whenever the rudder pedals are in neutral. Counterclockwise rotation of bellcrank 114 results in the opposite rotation of quadrant 131. Rotation of quadrant 131, as is well known, controls the position of valve shaft 134 of the hydraulic rudder control system 135, thereby determining the position of rudder 137 via rod 136.

Automatic rudder control via the sideslip stability augmenter system of Figure 8 is limited to a maximum of five degrees rudder deflection in either direction from neutral. The necessary limiting action may, for example, be provided by appropriate mechanical limiting stops at servo shaft 53 or output shaft 112 of Figure 8 (not shown) or by any suitable electronic means that limit the magnitude of the output signal from servo amplifier 35 of Figure 8 (not shown). It is evident from what has been said in the preceding paragraph that this automatic rudder control can, at any time, be "manually" overridden by rudder deflection executed at the will of the pilot, i. e. through appropriate pedal actuation which rotates cable drum 117 of Figure 8 via cables 122 and 123 and results in a corresponding amount of rotation of quadrant 131 and deflection of rudder 137 in the desired direction, the latter adding algebraically to whatever rudder deflection may simultaneously issue from automatic action of the side-slip stability augmenter system.

Figure 10:
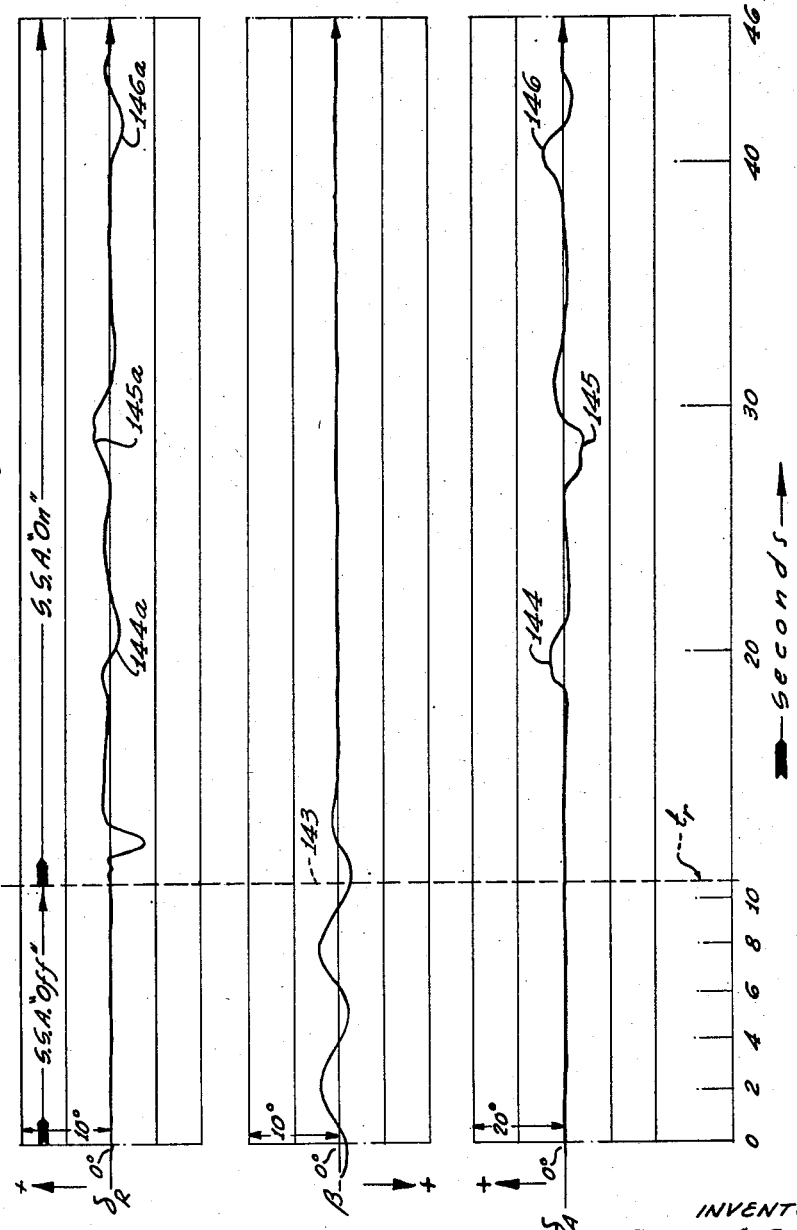
Figure 10 is a plot showing a sideslip response curve before and after the sideslip stability augmenter is turned on, as well as aileron and rudder response curves with (manual) aileron deflections added during the latter period.

The curves of Figures 9 and 10 serve to illustrate the actual effect on sideslip resulting from application of sideslip stability augmenter control in the rudder channel of an aircraft of given dynamic characteristics.

In Figure 9, rudder deflections $\delta_R$ and sideslip angles $\beta$ are plotted against the same time scale, the left section of the plots showing the building-up of typical sideslip oscillations, in particular after application of manual step rudder deflections 138 and 139 (negative and positive, respectively), for the duration of flight up to time $t_c$ (demarcation line 140) during which sideslip stability augmenter control has remained inactive. Shortly after the sideslip stability augmenter has been switched "on" (after time $t_c$), an additional negative step rudder deflection 141 has been applied. The curves show in a persuasive manner the effectiveness of rudder action due to sideslip stability augmenter control: (a) in eliminating the prevalent sideslip oscillations; and (b) in reducing the effects of a relatively strong momentary manual rudder deflection at 141 to an insignificant sideslip transient at 142.

In Figure 10, rudder deflections $\delta_R$, aileron deflections $\delta_A$ and sideslip angles $\beta$ are plotted against the same time scale. In this drawing, the portions of the curves to the left of demarcation line 143 up to time $t_r$ show a prevalent sideslip oscillation with both rudder and aileron in neutral while the sideslip stability augmenter control remains switched "off." As soon as the latter control is switched "on" (after time $t_r$), rudder action is shown to be initiated which effectively eliminates any further sideslip. Manual aileron deflections at 144, 145 and 146 resulting in rudder actions at 144a, 145a and 146a, respectively, do not produce any noticeable sideslip.

What is claimed is:

1. In a high speed fighter type aircraft having a rudder: a control system for automatically minimizing "Dutch roll" oscillations during straight flight comprising, a single sensor mounted on said aircraft at a location in which said sensor provides initial control signals principally responsive to side-slip of said aircraft and that portion of yaw resulting from aileron deflection and to a minimum degree responsive to translational forces and that portion of yaw resulting from rudder deflection, signal generating means connected to said sensor for receiving said initial control signals and deriving final control signals therefrom proportional to the algebraic sum of the time rate of change and magnitude of said initial control signals, and rudder actuating means responsive to said final control signals for deflecting the rudder in corresponding proportions and in a sense that counteracts said initial control signals.

2. In a high speed aircraft in flight provided with rudder and aileron control surfaces, means for automatically minimizing transient and steady state side-slip during maneuvers of said craft and during disturbances encountered in normal operation thereof comprising, single sensor means mounted on said aircraft for jointly detecting deflection forces acting on said aircraft due to side-slip and yaw, the latter being principally due to aileron deflection and to a minimum degree rudder deflection, and electrical network for converting said detected deflection forces into initial control signals proportional to the algebraic sum of the time rate of change and magnitude of said detected side-slip or yaw, pick-off means and electrical circuitry for deriving continuous delayed aileron control signals proportional to the deflection of said aileron control surfaces from neutral, means for delaying said aileron control signals to establish coincidence therebetween and said initial control signals, electrical circuitry for combining said initial and aileron control signals into a composite control signal, an automatic actuating means for deflecting said rudder control surface in response to said composite control signal, the sense of rudder deflection due to said initial control signal components being directed in opposition to the forces producing said detected sideslip or yaw, and the sense of rudder deflection due to said aileron control signal components being chosen to always correspond to the sense of deflection of said ailerons.

3. In a high speed aircraft as set forth in claim 2, including electrical rudder trim control means consisting of a manually controllable potentiometer connected into the electrical network associated with said first airborne reference source, said manually controlled potentiometer furnishing a signal proportional to the manual setting thereof which is added algebraically to the signals from said first reference source in a manner so that said potentiometer signal and the corresponding amount of rudder deflection remains effective at such times as said initial and aileron signals are reduced to zero.

4. In a high speed fighter craft having rudder and aileron control surfaces, means for automatically coordinating aileron turns during maneuvers of said craft comprising, a first airborne reference source responsive to side-slip, skid and yaw of said craft, said yaw being principally due to aileron deflection and to a minimum degree rudder deflection; a first network for jointly deriving from said first reference source control signals proportional to the rate of change of transient side-slip, skid, and yaw as well as proportional to the steady state magnitude of side-slip, skid, and yaw of said craft; a second airborne reference source responsive to the magnitude and sense of deflection of said aileron control surfaces from neutral including control signal circuitry connected thereto; a second network and circuitry for combining said control signals from said first and said second airborne reference sources in their correct sense and proportions and in their correct time relationship to provide a composite control signal, means for receiving and delaying the signal component from said second reference source to coincide with the portion of the signal component from said first reference source which is due to said yaw; and rudder actuating means for automatically deflecting said rudder control surface in the sense of and in proportion to the magnitude of said composite control signal, the sense of rudder deflection in response to the control signal component from said first reference source being in opposition to the sense of rates and magnitudes derived from said first reference source, and the sense of rudder deflection resulting from the control signal component due to said delayed aileron deflection signal being always the same as the sense of said aileron deflections.

5. Apparatus in accordance with claim 4, wherein said first airborne reference source is a bubble type accelerometer mounted with its sensitive axis parallel to the lateral axis of said craft and at a predetermined position forward of the center of gravity of said craft at such times as the latter is subject to predetermined loading conditions and at a position adjacent the effective center of rotation of said craft due to aerodynamic forces acting on said rudder control surface.

6. In a high speed aircraft having rudder and aileron control surfaces and provided with a yaw damping installation responsive to a yaw rate signal principally due to aileron deflection and to a minor degree rudder deflection and which is operative through said rudder control surface, means for automatically minimizing the rate of side-slip at the onset of said craft's yawing motion due to an aileron initiated turn comprising, an aileron deflection pick-off device and circuitry for providing therefrom a rudder control signal responsive to the sense and proportional to the magnitude of aileron deflection of said aircraft; means for establishing coincidence between the yaw rate signal due to rolling velocity of said craft to which said yaw damping installation responds and said aileron deflection signal; and means for algebraically adding said yaw rate and aileron deflection signal, the aileron deflection being of a sign that produces deflection in the sense of said aileron initiated turn and is always opposing the sense of rudder deflection due to the action of said yaw damping installation.

7. In an aircraft means for automatic coordination of aileron turns comprising, a portion of an autopilot which controls the rudder of said craft by means of a composite signal, a first signal component of said composite signal being derived from a network connected to an aileron potentiometer pick-off and acting to deflect said rudder in the direction of said aileron turn in proportion to the magnitude of aileron deflection, thereby establishing approximate aileron turn coordination, a second signal component of said composite signal being derived from an accelerometer sensitive to sideslip and skid, and duly differentiated so as to accomplish transient control, said second signal component acting to deflect the rudder in a direction to minimize transient and steady state forces sensed by said accelerometer, thereby acting to correct the control effect of said first signal component in case the latter is not of the exact magnitude to provide perfect turn coordination.

References Cited in the file of this patent

UNITED STATES PATENTS

| 2,367,465 | Kunzer | Jan. 16, 1945 |
| 2,371,388 | Glenny | Mar. 13, 1945 |
| 2,387,795 | Isserstedt | Oct. 30, 1945 |
| 2,420,932 | Cornelius | May 20, 1947 |
| 2,446,180 | Haskins, Jr. | Aug. 3, 1948 |
| 2,461,533 | Dose | Feb. 15, 1949 |
| 2,487,793 | Esval et al. | Nov. 15, 1949 |
| 2,488,286 | Glenny | Nov. 15, 1949 |
| 2,595,309 | Slater | May 6, 1952 |
| 2,604,613 | Klass | July 22, 1952 |
| 2,619,623 | Meredith | Nov. 25, 1952 |
| 2,633,313 | Kutzler | Mar. 31, 1953 |
| 2,646,947 | Kutzler | July 28, 1953 |

FOREIGN PATENTS

| 679,586 | Great Britain | Sept. 17, 1952 |